United States Patent [19]

Suzuki et al.

[11] Patent Number: 4,606,022

[45] Date of Patent: Aug. 12, 1986

[54] DATA TRANSMISSION/RECEPTION NETWORK SYSTEM

[75] Inventors: Tadashi Suzuki; Norimasa Kishi, both of Yokohama; Minoru Tomikashi, Zushi; Toru Futami, Yokosuka, all of Japan

[73] Assignee: Nissan Motor Company, Limited, Japan

[21] Appl. No.: 592,547

[22] Filed: Mar. 23, 1984

[30] Foreign Application Priority Data

Jun. 13, 1983 [JP] Japan ................. 58-105541

[51] Int. Cl.[4] ............................. H04J 3/02; H04J 3/06
[52] U.S. Cl. ........................................ 370/85; 370/100
[58] Field of Search ............................ 370/85, 86, 100

[56] References Cited

U.S. PATENT DOCUMENTS

| 3,757,050 | 9/1973 | Mizote | 179/15 AL |
| 3,924,077 | 12/1975 | Blakeslee | 370/85 |
| 3,932,841 | 3/1976 | Deerfield | 370/85 |
| 4,156,112 | 5/1979 | Moreland | 370/85 |
| 4,220,822 | 9/1980 | Kawai et al. | 370/85 |
| 4,426,697 | 1/1984 | Peterson et al. | 370/85 |

FOREIGN PATENT DOCUMENTS 5213367 12/1972 Japan .

Primary Examiner—Douglas W. Olms
Assistant Examiner—Frank M. Scutch, III
Attorney, Agent, or Firm—Lane and Aitken

[57] ABSTRACT

A data transmitting/receiving network system connects a plurality of stations via a data transmission bus line in a time sharing mode. A specially encoded clocking signal cycles through a plurality of unique states and each station is allowed to transmit/receive in one of the unique cycles. Each station is equipped with serial-to-parallel reception and parallel-to-serial transmission so that a plurality of bits can be transmitted/received in each cycle. Parity error checking is performed on the transmitted/received bit parcels.

5 Claims, 6 Drawing Figures

FIG.1
(PRIOR ART)
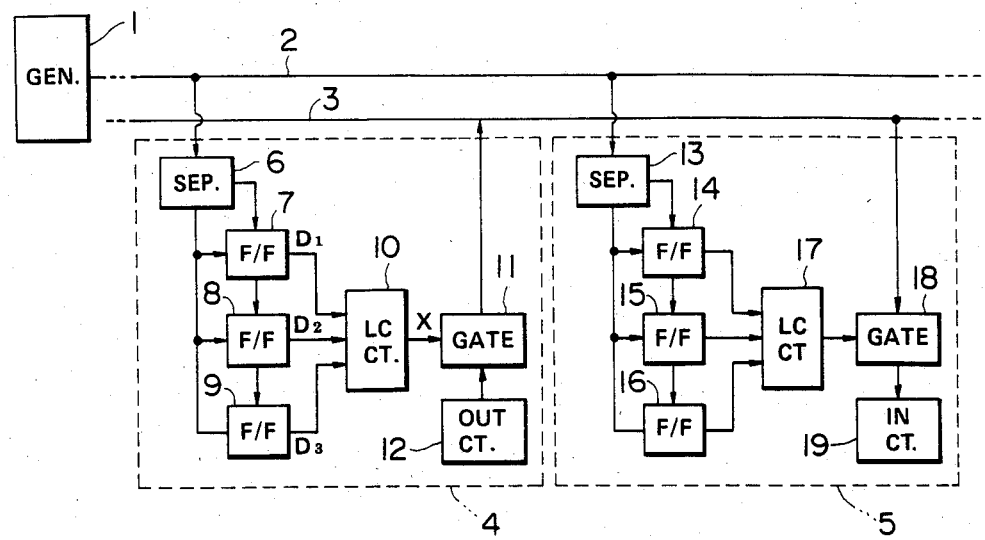
FIG.2
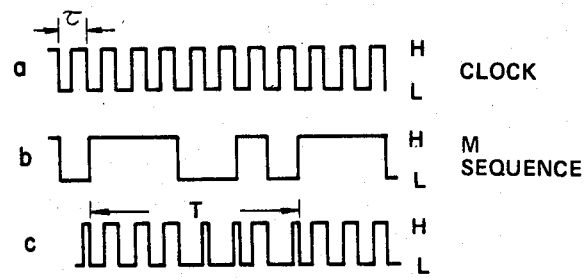
a — CLOCK
b — M SEQUENCE
c
FIG.3
| | (6) | (7) | 1 | 2 | 3 | 4 | 5 | 6 | 7 | (1) | |
|---|---|---|---|---|---|---|---|---|---|---|---|
| D₁ --- | H | H | H | L | L | H | L | H | H | H | --- |
| D₂ --- | L | H | H | H | L | L | H | L | H | H | --- |
| D₃ --- | H | L | H | H | H | L | L | H | L | H | --- |
| X --- | L | H | L | L | L | L | L | L | H | L | |

4,606,022

DATA TRANSMISSION/RECEPTION NETWORK SYSTEM

BACKGROUND OF THE INVENTION

1. Field of the Invention

The present invention relates to a network system for data transmission wherein a plurality of stations, i.e., transmitters or receivers are connected via a data transmission bus line and a separate synchronous signal transmission bus line and a predetermined code string signal is supplied to each station so that a plurality of addresses changing sequentially at a predetermined frequency are allocated among the stations.

2. Description of the Prior Art

Japanese Patent Publication No. 52-13367 and corresponding U.S. Pat. No. 3,757,050 published on Sept. 4, 1973, to Masanori Mizote discloses a multichannel transmission system for producing, transmitting and receiving pulse signals assigned to corresponding signal channels and modulated for information conveyance, the disclosure of which is incorporated by reference.

FIG. 1 shows a block diagram of a conventional data transmission network system exemplified in the above-described U.S. Pat. No. 3,757,050. In FIG. 1, a plurality of pairs of transmission stations (or transmitters) 4 and reception stations (or receivers) 5 are connected via a synchronous signal transmission bus line 2 and a data transmission bus line 3. The synchronous signal transmission bus line 2 provides a means for conducting the synchronous signal shown in FIG. 2(c) from a synchronous signal generator 1 to each station. The synchronous signal generator 1 generates a clock pulse train having a constant period $\tau$ as shown in FIG. 2(a), an M-sequence code string repeating the order of H(1), H(1), H(1), L(0), L(0), H(1), L(0) at a constant period (T) as shown in (b) of FIG. 2, a pulsewidth-modulated signal as shown in (c) of FIG. 2.

Each transmission station 4 comprises: (a) a receiver circuit 6 which receives the above-described synchronous signal and demodulates the clock pulse train and M-sequence signal shown in FIG. 2; (b) shift registers 7, 8, and 9 which shift sequentially the bits of the demodulated M-sequence signal in synchronization with the clock pulses; and (c) a logic circuit 10 which opens a gate circuit 11 when a predetermined logical value results from a logical operation on the outputs of the shift registers 7, 8, and 9.

FIG. 3 shows a combination pattern of the logical outputs $D_1$, $D_2$, and $D_3$ of the shift registers 7, 8, and 9 in connection with the output X of the logic circuit 10 for each clock pulse of the clock pulse train signal. As seen from FIG. 3, seven different combinations of the levels "L" and "H" of the shift registers 7, 8, and 9 occur during the frequency period T of the above-described M-sequence signal.

Accordingly, if one of the seven combinations satisfies the logical condition of the logic circuit 10 in each transmission station 4 (for example, H, H, and L as shown in FIG. 3), the logic circuit 10 is activated once during each period T of the above-described M-sequence signal so that the gate circuit 11 is opened. Consequently, one bit of data is transmitted from an output circuit 12 to the data transmission bus line 3 at this time.

Similarly, each reception station or receiver 5 comprises a receiver circuit 13, shift registers 14, 15, and 16 and logic circuit 17. A gate 18 is opened only when a predetermined pattern is achieved during each period T of the above-described M-sequence signal so that a signal from the data transmission bus line 3 is received by an input circuit 19.

In this way, data transmission and reception are made possible between transmitters 4 and corresponding receivers 5 having logic circuits 10 and 17 which have the same logical condition.

Therefore, each pair of transmission and reception stations 4 and 5 can transfer data asynchronously with the remaining transmission and reception stations having different established conditions. Consequently, the transfer of data can be made without collision of data.

However, since only one bit of data can be transferred whenever each gate circuit 11 and 18 is opened in the conventional data transmission network system, the number of bits per frequency period of the above-described M-sequence signal must be increased. Therefore, the construction of the synchronous signal generator 1 becomes complicated and the number of stages of the shift registers in each station is increased accordingly, thus resulting in the increase of the cost and the reduction of processing speed.

In addition, the reliability of the network system is reduced since data transfer in units of one bit does not provide enough information to check for the occurrence of bit error.

SUMMARY OF THE INVENTION

With the above-described problems in mind, it is an object of the present invention to provide a reliable network data transmission system capable of transmitting and receiving a plurality of bits of data and capable of checking for the occurrence of bit error.

This can be achieved by providing a data transmission network system which delivers a predetermined M-sequence signal to each station via the synchronous signal transmission bus line and allocates a plurality of addresses changing sequentially at a predetermined frequency to each station, wherein each station comprises at least one of either means for serially transmitting a plurality of bits of data via the data transmission bus line or means for serially receiving a plurality of bits of data from the data transmission bus line.

BRIEF DESCRIPTION OF THE DRAWINGS

A more complete understanding of the present invention may be obtained from the following detailed description taken in conjunction with the attached drawings in which like reference numerals designate corresponding elements and in which:

FIG. 1 is a simplified block diagram of a conventional network system disclosed in U.S. Pat. No. 3,757,050;

FIG. 2 is a waveform pattern generated from a synchronous signal generator 1 shown in FIG. 1;

FIG. 3 is an explanatory diagram showing the change pattern of address obtained from the synchronous signal;

DETAILED DESCRIPTION OF THE PREFERRED EMBODIMENTS

Reference will be made hereinafter to the drawings FIGS. 4 through 6 in order to facilitate understanding of the present invention.

Figure 4:
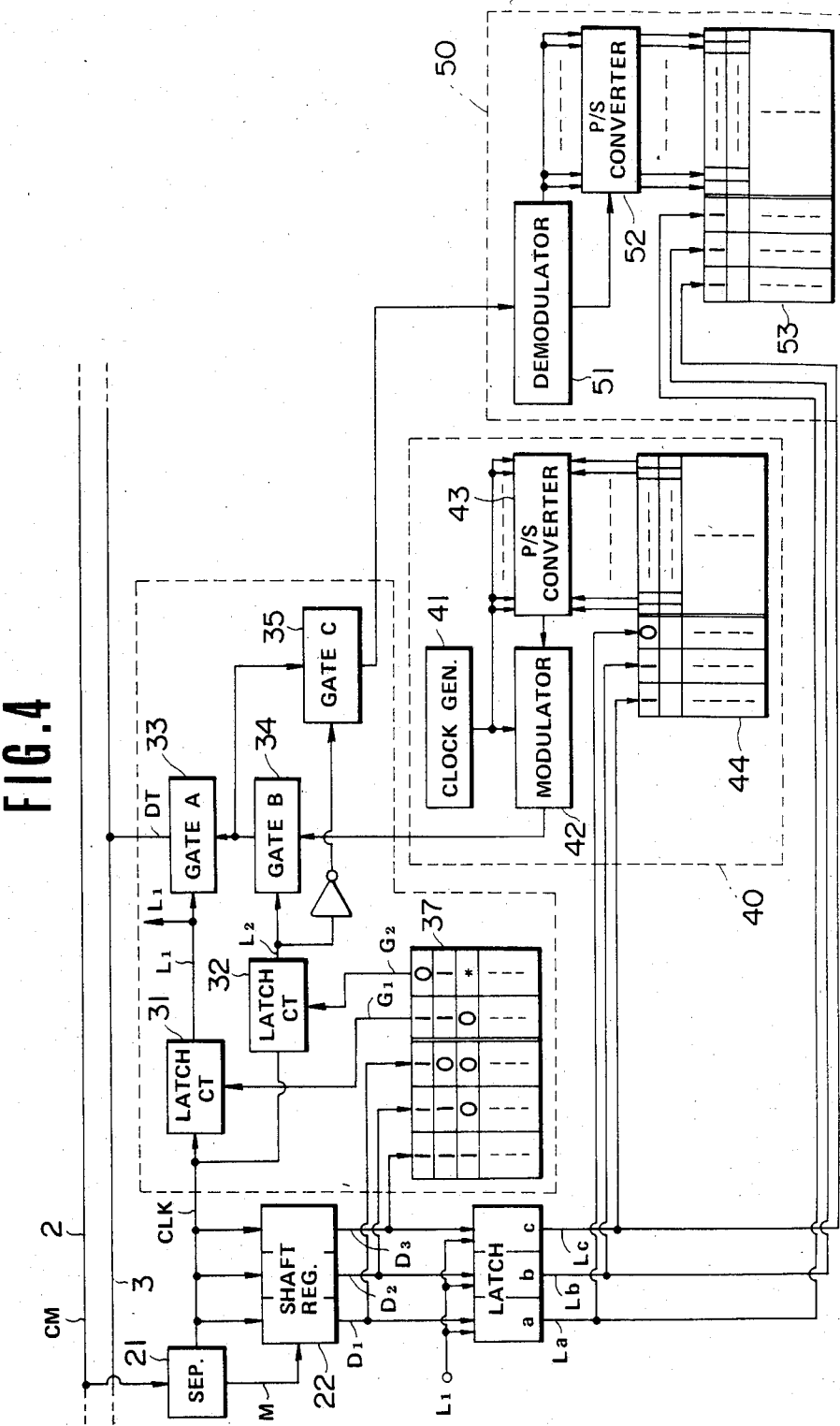
FIG. 4 is a simplified block diagram of a first preferred embodiment of a network system according to the present invention.
Figure 5:
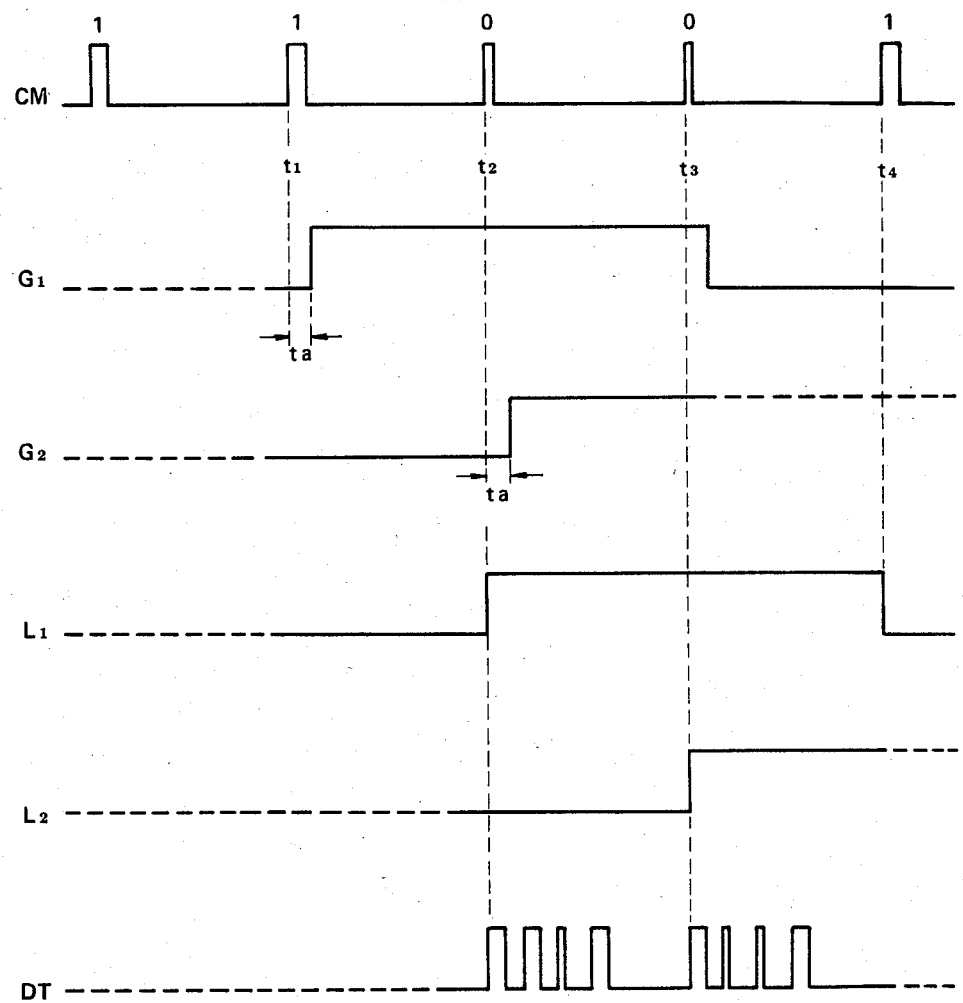
FIG. 5 is a timing chart of the main input/output waveforms for aid in explaining the operation of the system shown in FIG. 4.

FIG. 4 shows a first preferred embodiment according to the present invention. It should be noted that FIG. 4 shows the internal structure of one representative of the plurality of stations constituting the system. Since the other stations have the same internal structures, detailed description of other stations will not be given.

In the network system of this embodiment, the plurality of stations shown in FIG. 4 are connected via the synchronous signal transmission bus line 2 and data transmission bus line 3. The synchronous signal CM and the M-sequence code supplied to each station from the synchronous signal generator 1 shown in FIG. 1 have the same patterns as those shown in FIG. 2 and FIG. 3.

The receiver circuit 21 receives the synchronous signal CM from the synchronous signal transmission bus line 2 (the same signal pattern as those shown in (c) of FIG. 2) and separates the synchronous signal CM into the clock signal CLK shown in (a) of FIG. 2 and M-sequence code shown in (b) of FIG. 2, these separated signals being supplied to three stages of shift register 22. The shift register 22 outputs logical patterns $D_1$, $D_2$, and $D_3$ as shown in FIG. 3. The outputs $D_1$, $D_2$, and $D_3$ of the shift register 22 are supplied to a set of latches a, b, c and to a memory circuit 37 provided within a transmission/reception control circuitry 30. The memory circuit 37 stores data $G_1$ and $G_2$ used to control data transmission and reception to each address, the combination of "H"'s and "L"'s corresponding to each period T of the above-described M-sequence signal being allocated to one address.

A latch circuit 31 latches the output $G_1$ of the memory circuit 37 in synchronization with a clock signal CLK supplied from the receiver circuit 21. The latch circuit 31 comprises, for example, a D-type flip-flop. The output $L_1$ of the latch circuit 31 is supplied to a gate circuit A denoted by 33 and latches a, b, and c. Another latch circuit 32 serves to latch the output $G_2$ of the memory circuit 37 in synchronization with the above-described clock pulse train signal CLK and also comprises a D-type flip-flop. The output $L_2$ of the latch circuit 32 is supplied to a gate circuit C denoted by 35 via a gate circuit B denoted by 34 and parallelly via an inverter 36.

In addition, a transmitter circuit 40 comprises: (a) a memory circuit 44 holding a plurality of bits of data; (b) a parallel-to-serial data converter 43 which converts parallel data from the memory circuit 44 into a serial form; (c) a clock pulse generator 41 which supplies a clock signal of a predetermined period ($<<T$) to the parallel-to-serial data converter 43; and (d) a modulator 42 which modulates the pulsewidth of the clock pulse train signal generated by the clock generator 41 so as to correspond to the levels of "H" and "L" of the serial data from the parallel-to-serial data converter 43 (hereinafter denoted by "1" and "0"). The outputs La, Lb, and Lc of latches, a, b, and c are supplied to the memory circuit 44 as address data to elicit output of data stored in the address specified by the combination of the latch outputs La through Lc.

In addition, the receiver circuit 50 comprises: (a) a demodulator 51 which demodulates and separates data received via the gate circuit C denoted by 35 into the clock pulse train signal and data signals; (b) a serial-to-parallel data converter (S/P converter) 52 which converts the modulated data into the parallel form; and (c) a memory circuit 53 storing the parallel data from the serial-to-parallel data converter 52.

The memory circuit 53 receives the outputs La, Lb and Lc of the latches a, b, and c as address data and loads data supplied from the above-described serial-to-parallel data converter 52 into a specified address.

The memory circuits 44 and 53 provided within the respective transmitter and receiver circuits 40 and 50 are connected to a microcomputer (not shown). The transmission data are written into the memory circuit 44 according to the state of a controlled load and the controlled load is controlled on the basis of data read from the memory circuit 53.

For example, in the above-described network system, data is stored as shown in FIG. 4 in the memory circuit 37 within the transmission/reception control circuit 30 of one of the plurality of stations constituting the network system. On the other hand, an area for data transmission and reception is provided in an address shown in FIG. 4 of the other memory circuits 44 and 53. In addition, the synchronous signal CM shown in FIG. 5 is supplied to each station and the outputs $D_1$ through $D_3$ of the shift register 22 in the station shown in FIG. 4 are $<"1", "1", "1">$ at time $t_1$ shown in FIG. 5.

As described above, since the outputs of the shift register 22 take a form of $<"1", "1", "1">$, the output $G_1$ of the memory circuit 37 turns to a "1" after a delay time $t_a$ and the other output $G_2$ turns to a "0". The delay time $t_a$ is the time required for the demodulation performed by the receiver circuit 21.

In the above-described state, the latch circuit 31 and latch circuit 32 receive the clock pulse signal CLK at the time $t_2$ after one period of the above-described synchronous signal CM has passed. The outputs $G_1$ and $G_2$ of the memory circuit 37 at time $t_2$ are latched. That is to say, the output $L_1$ of the latch circuit 31 turns to a "1" and output $L_2$ of the latch circuit 32 turns to a "0".

Simultaneously, the output $L_1$ of the latch circuit 31 is supplied to the latches a through c so that the outputs of the shift registers 22 in the form $<"1", "1", "1">$ at time of $t_2$ are latched. The latch outputs La through Lc are supplied to the memory circuits 44 and 53 as address data.

After the above-described operation is performed, the outputs $D_3$ through $D_1$ of the shift register 22 take the form $<"1", "1", "0">$ after the delay time $t_a$ has passed, thus turning the output $G_1$ of the memory circuit 37 to a "1" and output $G_2$ to a "1".

Therefore, the gate circuit A 33 is opened since the output $L_1$ of the above-described latch circuit 31 is turned to a "1" and the gate circuit C 35 is opened since the output $L_2$ of the latch circuit 32 is turned to a "0", so that the receiver circuit 50 is enabled to receive transmitted data. Therefore, the receiver circuit 50 receives serial data comprising a plurality of bits from the data transmission bus line 3 via the gate circuits A 33 and C 35. Thereafter, the input data is demodulated, converted into parallel data, and loaded into the memory circuit 53.

At this time, the memory circuit 53 receives $<"1", "1", "1">$ as address data and loads the received data into a memory cell corresponding to the address specified by $<"1", "1", "1">$.

Next, after another period of the above-described synchronous signal CM has passed and the time $t_3$ is reached, the outputs $G_1$ and $G_2$ of the memory circuit 37 are latched by means of the latch circuits 31 and 32. At this time, the above-described output $G_1$ is turned to a "1" and output $G_2$ is turned to a "1", so that the output $L_1$ of the latch circuit 31 is turned to a "1" and output $L_2$ of the latch circuit 32 is turned to a "1".

In this way, the gate circuit A 33 is opened, the gate circuit B 34 is opened, and the gate circuit C 35 is closed, so that the transmitter circuit 40 is enabled to transmit data.

On the other hand, the outputs La through Lc of the latches a through c are used to latch the outputs of the shift registers 22 in the form <"1", "1", "0"> at time $t_3$ and to supply them to the memory circuits 44 and 53.

The outputs $D_3$ through $D_1$ of the shift registers 22 take the form <"1", "0", "0">, having been shifted through one stage by the shift registers 22 after the delay time $t_a$ has passed after time $t_3$ and accordingly the output of the memory circuit 37 is updated.

Therefore, serial data comprising a plurality of bits is transmitted from the transmitter circuit 40 to the data transmission bus line 3 via the gate circuits A 33 and B 34 until one more period of the synchronous signal CM passes after time $t_3$. At this time, the transmitted data within the area of the memory circuit 44 corresponding to the address data <"1", "1", "0"> is sent onto the bus 3.

As described above, in the station shown in FIG. 4, data can be received when the address is <"1", "1", "1"> and, on the other hand, data can be transmitted when the address is <"1", "1", "0">.

If the memory circuits 37, 44, and 58 are set in such a way that data is transmitted when the address is <"1", "1", "1"> in one of the other stations and data can be received when the address is <"1", "1", "0">, synchronization between this station and the station shown in FIG. 4 is achieved, allowing transmission and reception of data between the two stations.

Furthermore, if data is set in the memory circuit 37 of the station shown in FIG. 4 in such a way that data reception is enabled when the other address is, e.g., <"0", "0", "1"> and data transmission is enabled when the address is <"0", "1", "0"> and in another station, data transmission is enabled when the address is <"0", "0", "1"> and data reception is enabled when the address is <"0", "1", "0">, the transmission and reception of data between these stations without collision is achieved.

In this way, the station shown in FIG. 4 can perform transmission and reception of data independently to and from the other two stations without collision of data.

Hence, as described above, if the data transmission and reception is mediated by an address common to the stations between which the transmission and reception of data are carried out, synchronous addressing with each other in accordance with the synchronous signal CM is facilitated.

Furthermore, one station can transmit and receive a plurality of different data to and from a plurality of stations, thus the system performance being improved remarkably.

On the other hand, since in the network system shown in FIG. 4, the transmitted and received data comprise a plurality of bits, the data can be checked for the occurrence of bit errors.

Figure 6:
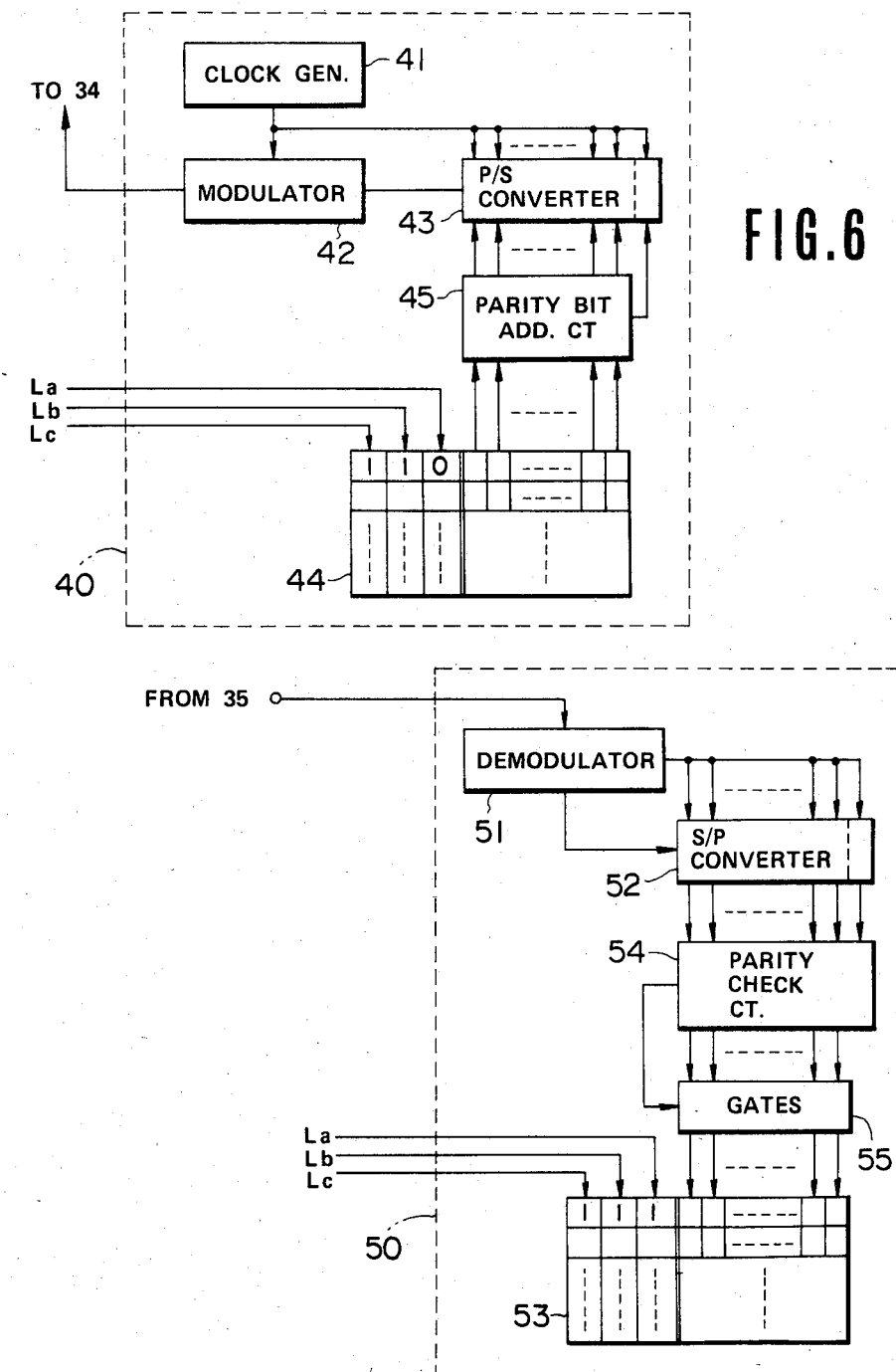
FIG. 6 is a simplified block diagram of an essential part of a second preferred embodiment according to the present invention.

One example of a method of checking for the occurrence of a bit error is a parity-check method shown in FIG. 6.

As shown in FIG. 6, the transmitter circuit 40 is provided with a parity bit adding circuit 45 and the receiver circuit 50 is provided with a parity check circuit 54 and a parallel gate circuit 55.

Hence, during transmission of data, a plurality of bit-parallel data outputted by the memory circuit 44 are supplied to the parity bit adding circuit 45 and to the parallel-to-serial data converter 43 with a parity bit added.

During reception of data, the serial data to which the parity bit is added is received and supplied to the parity check circuit 54 via the demodulator 51 and serial-to-parallel data converter 52 in order to check for the presence of bit errors in the received data. If the received data contains no bit errors, the gate circuit 55 is opened to load the data into the memory circuit 53. If the received data contains a bit error, the gate circuit 55 is closed so that the erroneous data is inhibited from entering the memory circuit 53

It should be noted although in the embodiment shown in FIG. 4 the outputs of the shift registers 22 are supplied to the memory circuits 44 and 53 via the latches a through c, which delay the outputs of the shift register 22 by one period T of the synchronous signal CM, the outputs of the shift register 22 may alternatively be supplied to the memory circuit 44 and memory circuit 53 directly. In the latter case, a minimal delay time is required with respect to the pulses of the synchronous signal CM for timing the transmission or reception of data.

As described in detail above, the network system according to the present invention can transmit and receive a plurality of bits of data, thus, improving the reliability due to the capability of checking for the presence of bit errors.

In addition, since the number of bits of the M-sequence signal serving as a synchronous signal need not be increased even if the number of bits of data is increased, the structure of the code generator can be simplified and the processing speed can be increased.

It will be clearly understood by those skilled in the art that the foregoing description is made in terms of the preferred embodiments and various changes and modifications may be made without departing from the scope of the present invention, which is to be defined by the appended claims.

What is claimed is:

1. A network system for transmitting and receiving data between a plurality of stations via a data transmission line, said system comprising:
    (a) first means for generating a clock pulse train having a predetermined period and being modulated with a predetermined code signal, and for applying the modulated clock pulse train to a synchronous signal bus line connected to the plurality of stations, said code signal defining a specific address in each period of said clock pulse train,
    (b) second means provided in each station connected to said signal bus line for receiving the modulated clock pulse train and for detecting a specific address allocated to such station from among successive addresses defined by said modulated clock pulse train; and
    (c) third means provided in each station connected to said signal bus line for transmitting or receiving a plurality of bits of data serially via the transmission line during a period of said clock pulse train in which said second means detects the specific address that has been allocated to said station.

2. The system of claim 1, wherein said transmitting means includes a parity bit selectively adding circuit for adding a parity bit to said plurality of bits.

3. The system of claim 2, wherein said receiving means includes a parity bit check circuit for checking for the presence of a bit error in transmitted data including the parity bit.

4. The system of claim 1, wherein said predetermined code signal is an M-sequence signal.

5. The system of claim 1, wherein said addresses change sequentially.

* * * * *